(12) United States Patent
Coder et al.

(10) Patent No.: US 7,143,866 B2
(45) Date of Patent: Dec. 5, 2006

(54) STRAND LUBRICATION

(75) Inventors: Timothy L. Coder, Effingham, KS (US); Dennis D. Hartman, Smithville, MS (US)

(73) Assignee: WLD, LLC, Boston, MA (US)

( * ) Notice: Subject to any disclaimer, the term of this patent is extended or adjusted under 35 U.S.C. 154(b) by 181 days.

(21) Appl. No.: 10/641,000

(22) Filed: Aug. 14, 2003

(65) Prior Publication Data

US 2004/0168859 A1 Sep. 2, 2004

Related U.S. Application Data

(63) Continuation-in-part of application No. 09/991,418, filed on Nov. 15, 2001, now Pat. No. 6,725,973.

(60) Provisional application No. 60/249,413, filed on Nov. 16, 2000.

(51) Int. Cl.
*F16N 1/32* (2006.01)

(52) U.S. Cl. ............... 184/15.2; 184/15.1; 184/24; 184/7.4

(58) Field of Classification Search ............... 184/15.2, 184/15.1, 24, 7.4
See application file for complete search history.

(56) References Cited

U.S. PATENT DOCUMENTS

| | | | |
|---|---|---|---|
| 498,558 A | 5/1893 | Lee | |
| 1,046,170 A * | 12/1912 | Thomas | 91/340 |
| 1,049,170 A | 12/1912 | Thomas | |
| 3,565,213 A | 2/1971 | Heller | 184/15 |
| 3,736,618 A | 6/1973 | Ramsey | 15/306 A |
| 3,783,972 A | 1/1974 | Molstad | 184/15 R |
| 4,046,225 A | 9/1977 | Shenk | 184/15 R |
| 4,063,617 A | 12/1977 | Shenk | 184/15 R |
| 4,069,894 A | 1/1978 | Black | 184/15 R |
| 4,296,837 A | 10/1981 | Charlton | |
| 4,326,605 A | 4/1982 | Conti | 184/15 R |
| 4,391,458 A * | 7/1983 | Blakeley | 285/373 |
| 4,422,529 A | 12/1983 | Johansen | 184/15 R |
| 4,498,558 A * | 2/1985 | Bendahan | 184/15.1 |
| 4,655,432 A | 4/1987 | Woodruff | |
| 4,693,502 A * | 9/1987 | Oetiker | 184/15.1 |
| 4,749,059 A | 6/1988 | Jonnes et al. | 184/15.1 |
| 4,862,996 A * | 9/1989 | Chisholm | 184/15.1 |
| 5,022,493 A | 6/1991 | Buckelew | 184/16 |
| 5,269,572 A | 12/1993 | Mefferd | |
| 5,573,531 A | 11/1996 | Gregory | |
| 5,595,262 A * | 1/1997 | Martin | 184/15.2 |
| 5,632,356 A | 5/1997 | Sells | 184/15.2 |
| 6,451,744 B1 | 9/2002 | Chang | |
| 6,725,973 B1 | 4/2004 | Coder et al. | |

FOREIGN PATENT DOCUMENTS

| | | |
|---|---|---|
| CA | 1 265 672 | 2/1990 |
| DE | 25 49 487 | 5/1977 |
| GB | 2 038 212 A | 7/1980 |
| GB | 2 077 789 A | 12/1981 |

OTHER PUBLICATIONS

PCT/US/25388, PCT Search Report.

* cited by examiner

*Primary Examiner*—David Fenstermacher
(74) *Attorney, Agent, or Firm*—Fish & Richardson P.C.

(57) ABSTRACT

A strand being pulled through a conduit is automatically lubricated.

40 Claims, 16 Drawing Sheets

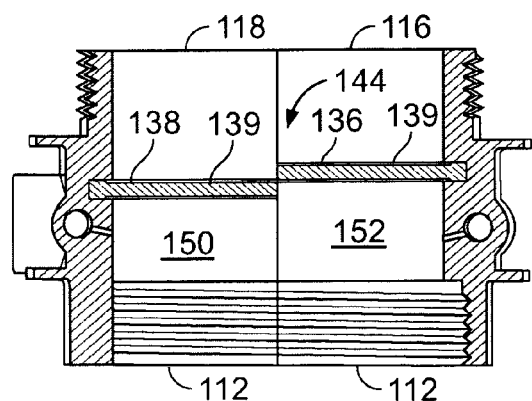
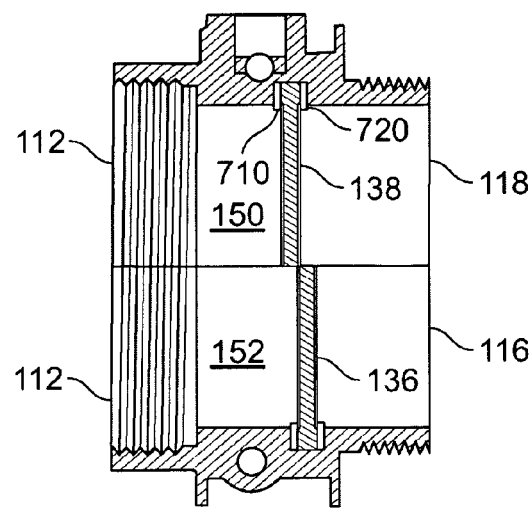
FIG. 12  FIG. 13
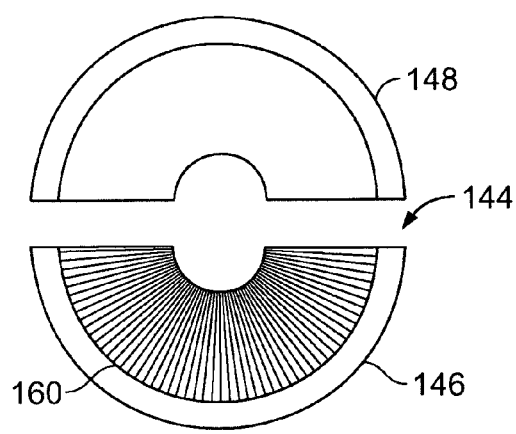
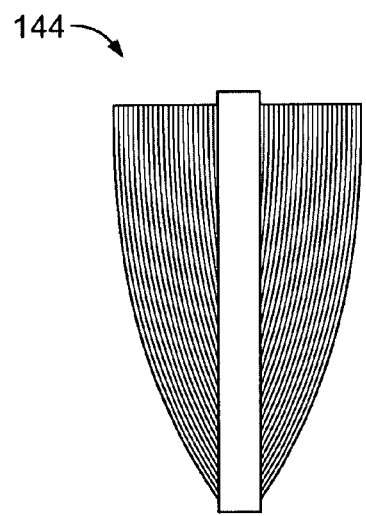
FIG. 14  FIG. 14A

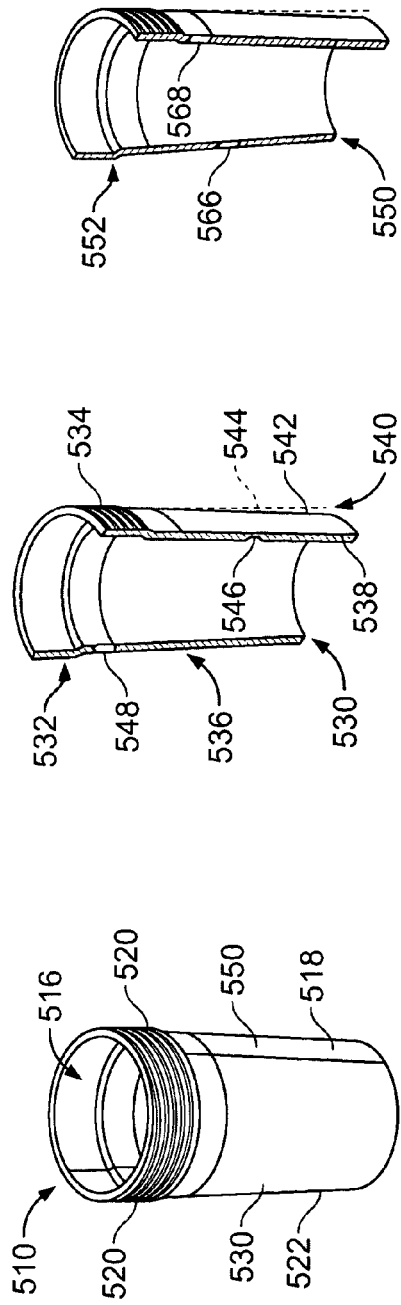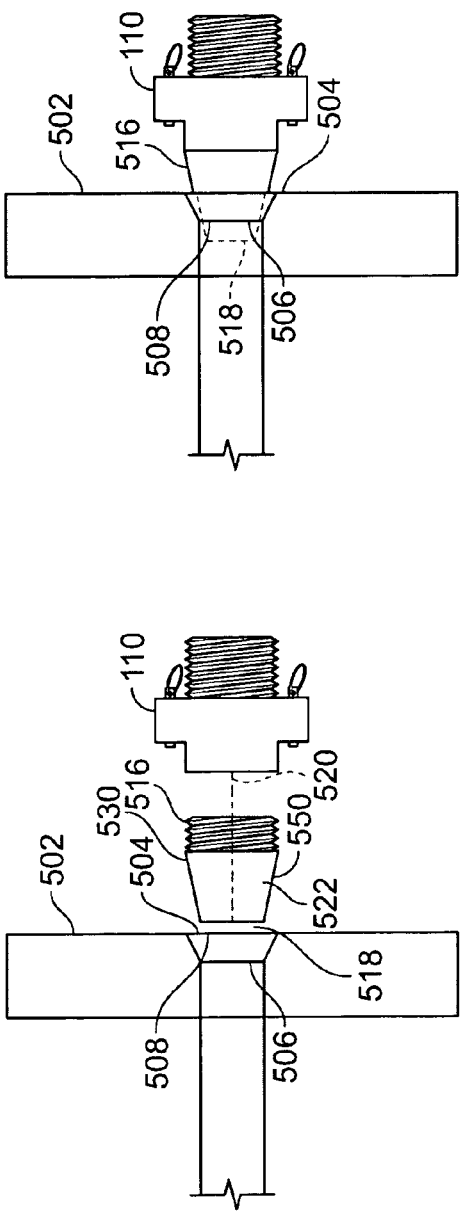

STRAND LUBRICATION

This patent application is a continuation-in-part and claims the benefit of the priority of U.S. patent application Ser. No. 09/991,418, filed Nov. 15, 2001 now U.S. Pat. No. 6,725,973, which claims the benefit of the priority of U.S. provisional patent application Ser. No. 60/249,413, filed Nov. 16, 2000.

BACKGROUND

This description relates to strand lubrication.

To make it easier to pull a strand or multiple strands (e.g., an insulated electrical wire) through a conduit, the strand is often lubricated. One person typically applies the lubricant, for example, soap, to the strand by hand as one or more other people (depending on the diameter and weight of the strand) withdraw the strand from a coil or other supply and feed it into the conduit. One or more people at the other end of the conduit pull on the strand while it is being lubricated and fed.

The end of the conduit typically has an external thread. After the wire is pulled through the conduit, a standard cylindrical bushing is screwed onto the end of the conduit to protect the wire from damage that might otherwise be caused by the sometimes-rough edge at the end of the conduit.

Various devices have been proposed to simplify the process of lubricating the strand while it is being pulled.

SUMMARY

In general, in one aspect, the invention features an apparatus comprising a lubricator to dispense a lubricant onto a strand while the strand is being pulled through a conduit, the lubricator being formed of a plastic material and having embedded channels that carry the lubricant under pressure from an inlet to outlets at which the lubricant is dispensed.

Implementations of the invention may include one or more of the following features. The plastic includes glass-filled polypropylene. The lubricator includes two plastic pieces. Ribs are formed on an outer surface of the lubricator.

In general, in another aspect, the invention features an apparatus comprising a lubricator to dispense a lubricant onto a strand while the strand is being pulled through a conduit, the lubricator configured to enable (a) a coupling of one end of the lubricator to an end of the conduit, and (b) a coupling of another end of the lubricator to a protective bushing.

Implementations of the invention may include one or more of the following features. The lubricator includes a thread on the one end to enable the coupling to the end of the conduit. The thread includes an internal thread that mates with an external thread of the conduit. The lubricator includes a thread on the other end to enable the coupling to be mated to the protective bushing. The thread includes an external thread that mates with an internal thread of the bushing. The lubricator includes an external thread on the other end that mates with an internal thread of the bushing and in which the internal thread on one end of the lubricator and the external thread on the other end of the lubricator are of the same pitch and matching diameter. The lubricator includes two pieces that are separable to mount the assembly around the strand.

In general, in another aspect, the invention features a method comprising mounting a lubricator temporarily on an end of a conduit through which a strand is to be pulled, pulling the strand through a bushing, the lubricator, and the conduit, unmounting the lubricator and removing it from the strand without removing the bushing from the strand, and mounting the bushing on the end of the conduit.

Implementations of the invention may include one or more of the following features. The bushing is mounted on the lubricator before pulling the strand. The bushing is unmounted from the lubricator before mounting the bushing on the end of the conduit. The lubricator is mounted onto the threaded end of the conduit by threading or clamping. The bushing is mounted on the end of the conduit by threading. The lubricator and the bushing are mounted on the end of the conduit using threads on the end of the conduit. The bushing is mounted on the end of the conduit without necessarily passing the bushing over a free end of the strand and along a length of the strand to reach the conduit.

In general, in another aspect, the invention features an apparatus comprising a lubricator to apply a lubricant to a strand as it is pulled through a conduit, and a brush to prevent the lubricant from leaking out of the lubricator, the brush being removable from the lubricator for replacement when the brush is worn.

Implementations of the invention may include one or more of the following features. The brush includes bristles arranged in a ring, an end of each of the bristles being held in a ring-shaped ferrule. The lubricator includes a receptacle into which the ring-shaped ferrule can be inserted and removed for replacement. The lubricator includes a groove to mate with the ferrule. The brush is removable by sliding a portion of the brush with respect to a portion of the lubricator. The brush defines a chamber between the brush and the conduit when the lubricator is mounted on the conduit, and the lubricator includes outlets configured to dispense lubricant into the chamber.

In general, in another aspect, the invention features an apparatus comprising a lubricator to apply a lubricant to a strand as it is pulled through a conduit, the lubricator having (a) two separable pieces that are joined to mount the lubricator around the strand and (b) a reservoir that holds a supply of lubricant, the reservoir being split between the two separable pieces, and (c) a seal to seal the reservoir when the two pieces are joined, the seal comprising a silicone packing mounted in at least one of the pieces.

Implementations of the invention may include one or more of the following features. The reservoir includes a ring-shaped tube that is formed in a wall of each of the two separable pieces, the tube being split when the pieces are not joined.

In general, in another aspect, the invention features an apparatus comprising a set of lubricators, each of the lubricators to apply a lubricant to a strand as it is pulled through a conduit, the lubricators being respectively configured for use with different sizes of conduit, and a holder having receptacles that are each sized to hold one of the lubricators of the set.

Implementations of the invention may include one or more of the following features. There are at least two but fewer than six lubricators in a set. A set includes a holder having receptacles that are each sized to hold one of the lubricators within the set, all the lubricators within one set being a different size than any of the lubricators of another set. The holder includes an airtight container that is sealed to prevent the lubricant from drying out. Apparatus comprising a container for a lubricator that is used to apply a lubricant to a strand as it is pulled through a conduit, the container including a receptacle that is configured to match a configuration of at least part of the lubricator to hold the lubricator in place as the container is moved, and a seal to prevent the lubricant from leaking outside the container. The container includes a body and a lid and the seal is between the body and the lid.

In general, in another aspect, the invention features an apparatus comprising an adaptor to adapt an end of a conduit to enable it to receive a coupling of a lubricator when the end of the conduit is held in a wall of a manhole, the adaptor including an annular body having one end to insert into the end of the conduit and another end having a coupling to receive the coupling of the lubricator.

Implementations of the invention may include one or more of the following features. The coupling of the adaptor includes threading. The one end of the annular body is tapered. The adaptor includes two pieces. The two pieces include halves of a cylinder. The adaptor is formed of plastic.

In general, in another aspect, the invention features an apparatus comprising a pump to force a lubricant from a supply to a lubricator at which the lubricant is to be dispensed onto a strand that is being pulled through a conduit, the pump being battery-powered.

Implementations of the invention may include one or more of the following features. A battery-powered motor drives the pump. Apparatus comprising a pump to force a viscous lubricant from a supply to a lubricator at which the lubricant is to be dispensed onto a strand that is being pulled through a conduit, the pump including a gear pump. The apparatus of claim also comprising a battery-powered motor to drive the gear pump, the motor having different transmissions to vary the amount of lubricant applied to the strand. A foot switch turns the motor on or off. The gear pump includes a pair of gears to force the lubricant from a reservoir to an outlet for a supply hose. A mechanism feeds lubricant from the supply to the reservoir. The mechanism includes an auger. The auger is geared to the gear pump. The auger is driven to oversupply the reservoir relative to the amount of lubricant being pumped by the gear pump.

In general, in another aspect, the invention features an apparatus comprising a pump to force a lubricant from a standard-sized bucket of lubricant to a lubricator at which the lubricant is to be dispensed onto a strand that is being pulled through a conduit, the pump including a flange configured to mate with an opening of the bucket and support the pump above the bucket.

Implementations of the invention may include one or more of the following features. An auger draws lubricant from the bucket, the auger being driven by a motor, the motor being mounted above the flange, the auger projecting below the flange. A follower plate has an aperture sized to accommodate the auger and to permit the follower plate to slide up and down along the auger. The follower plate has an outer edge configured to match an inner-side wall of the bucket and configured to slide up and down the suction pipe around the auger.

In general, in another aspect, the invention features an apparatus comprising a battery-powered pump to force a viscous lubricant from a supply to a lubricator at which the lubricant is to be dispensed onto a strand that is being pulled through a conduit, and a portable emergency battery to power the pump, the portable emergency battery including an electrical connector fitted to a housing of the battery to permit a cable between the battery and the pump to be connected and disconnected.

Implementations of the invention may include one or more of the following features. A foot switch controls the delivery of power from the battery to the pump.

In general, in another aspect, the invention features a method comprising mounting a lubricator on an end of a conduit, mounting a bushing on another end of the lubricator, and pumping lubricant from a supply to the lubricator, pulling a strand through the lubricator and through the conduit, the lubricant being dispensed onto the strand from the lubricator during the pulling.

Implementations of the invention may include one or more of the following features. The bushing is removed from the lubricator, the lubricator is removed from the conduit, and the bushing is mounted on the conduit.

In general, in another aspect, the invention features a method comprising drawing a lubricant from a supply to a reservoir using an auger, forcing the lubricant from the reservoir between two meshing gears into a supply line, and delivering the lubricant through the supply line to a lubricator to apply a lubricant to a strand as it is pulled through a conduit.

Implementations of the invention may include one or more of the following features. The two meshing gears and the auger are driven from a single motor. The auger and the two meshing gears are driven at relative speeds to cause the auger to oversupply the reservoir relative to the rate at which the lubricant is forced from the reservoir into the supply line.

In general, in another aspect, the invention features a method comprising pulling a strand from a supply of the strand through a conduit, at the supply end automatically lubricating the strand as it enters the conduit, and enabling a single person to control both the delivery of the strand from the strand supply to the conduit and the rate of delivery of lubricant from a supply of the lubricant.

Among the advantages of the invention are one or more of the following. Liquid soap or other lubricants (even very viscous lubricants) can be automatically and evenly applied over the wire without the lubricant having to be applied from an electrician's hands. The use of such device by electrical, data, communications, and maintenance personnel who pull wire through conduits will permit a smoother pulling of the wire and less chance of damaging the wire. The use of the mechanical device also reduces manpower requirements and thus labor costs by reducing cleanup time, material costs, and risk of damaging the wire.

Other advantages and features will become apparent from the following description and from the claims.

DESCRIPTION

Figure 10:
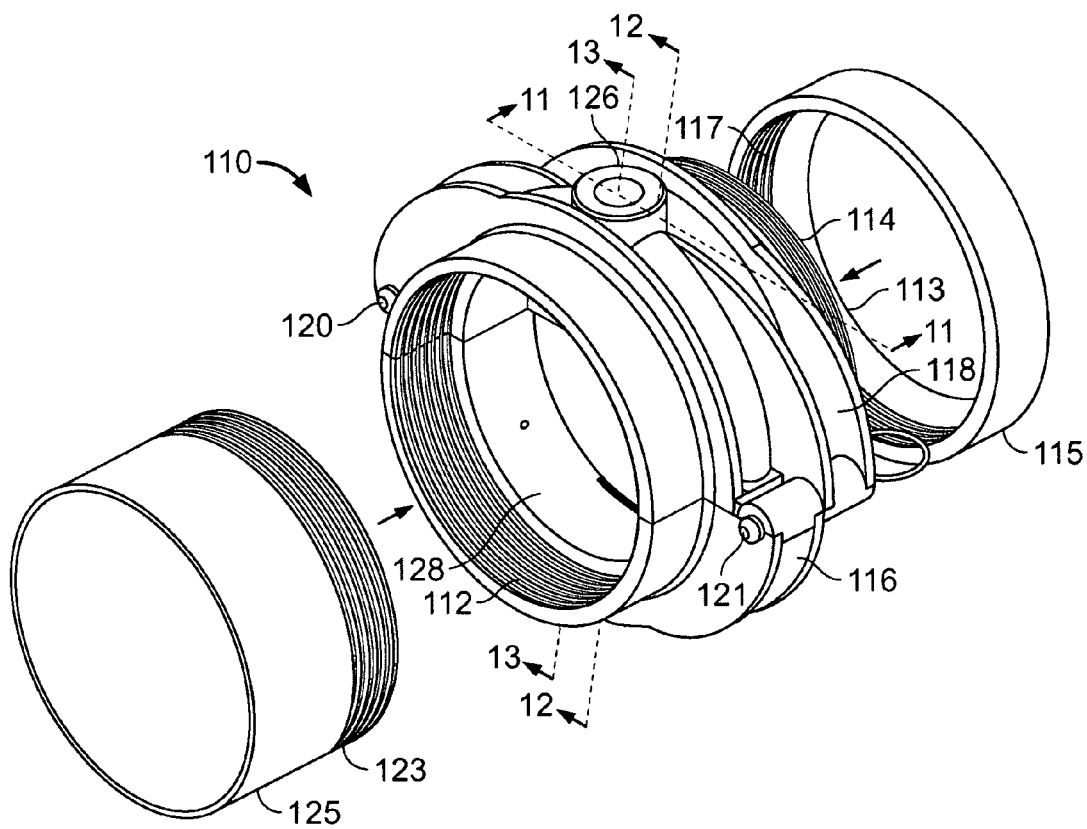
FIG. 10 is a three-dimensional view of another lubricator.

FIGS. 12 and 13 are side-sectional views of the lubricator along lines 12—12 and 13—13 of FIG. 10.

FIG. 14 is a top view of a dismantled brush.

FIG. 14A is a side view of the brush.

Figure 15:
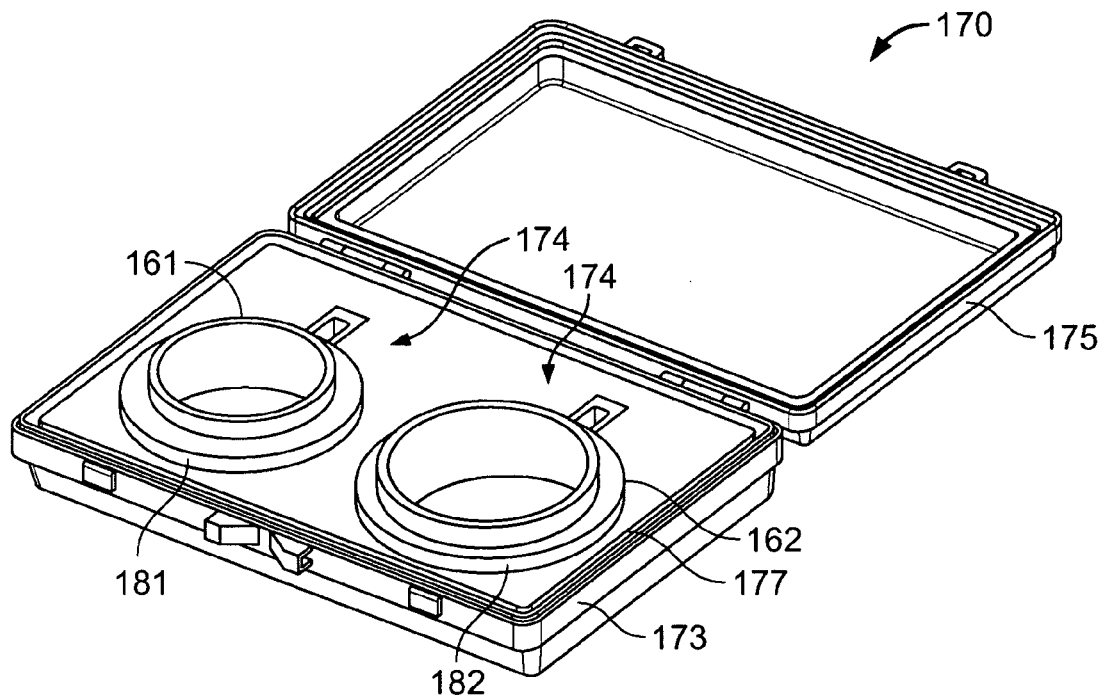

FIG. 15 is a three-dimensional view of a holder for the largest diameter lubricators.

Figure 15A:
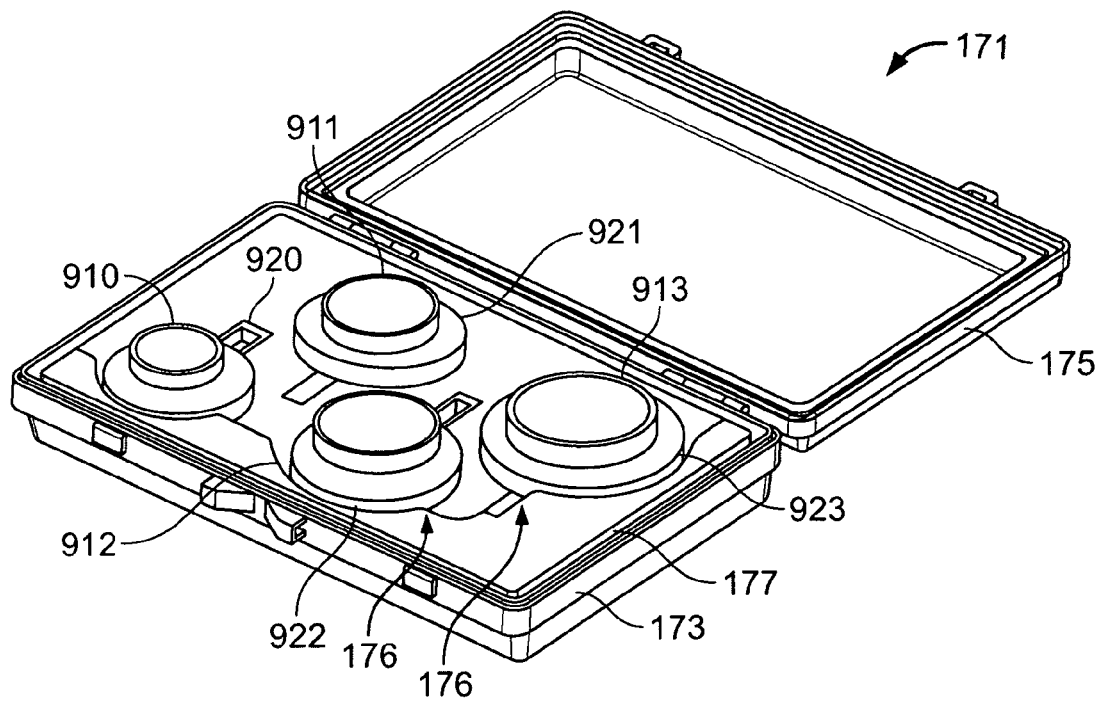

FIG. 15A is a three-dimensional view of a holder for the medium diameter lubricators.

Figure 16:
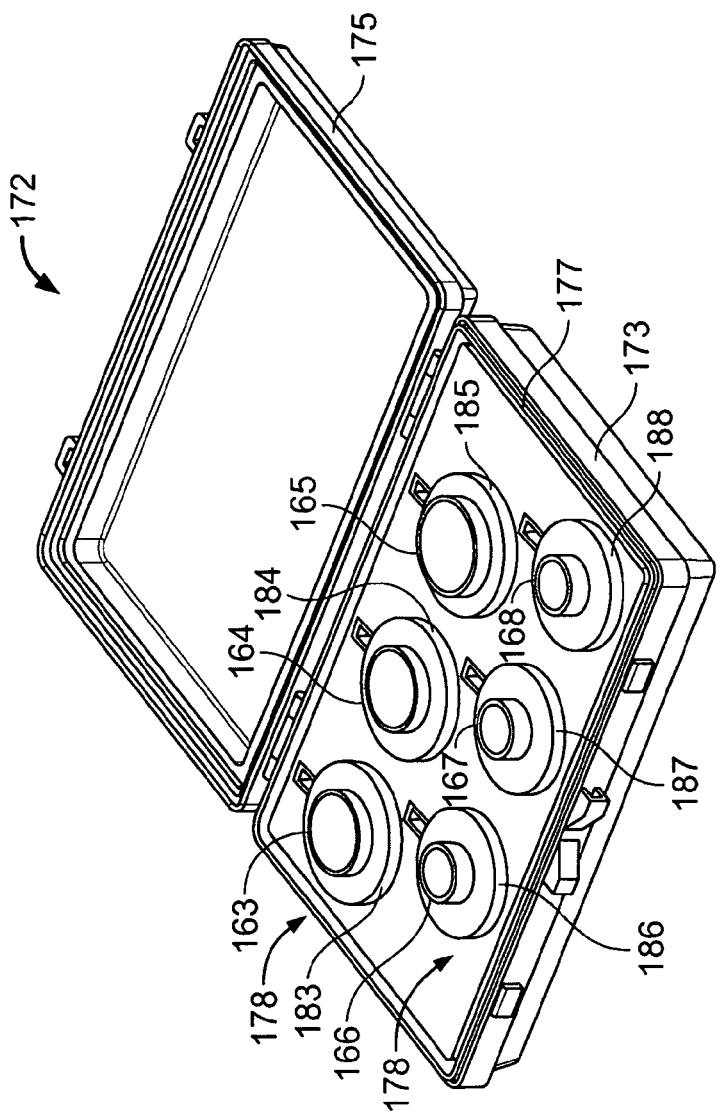

FIG. 16 is a three-dimensional view of a holder for the smallest diameter lubricators.

Figure 17:
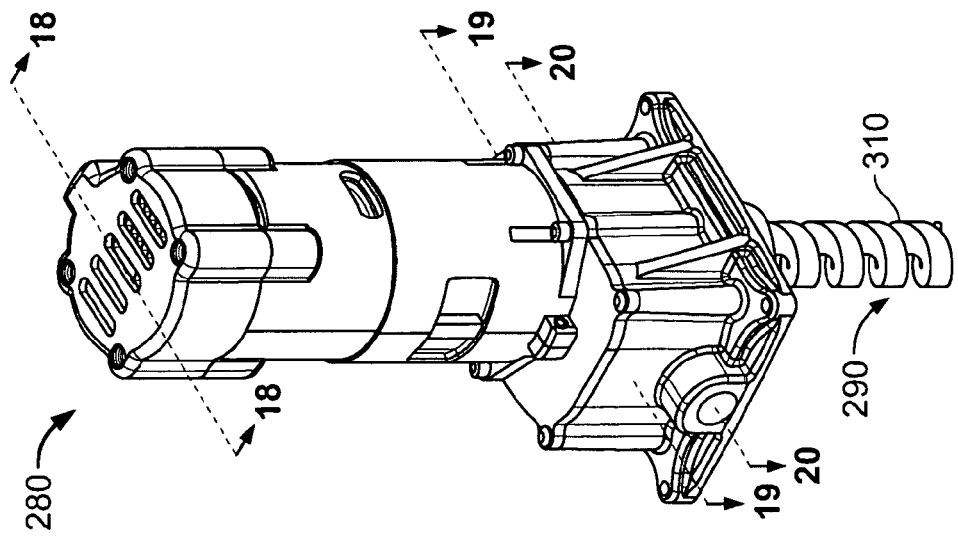

FIG. 17 is a three-dimensional view of a pump.

Figure 17A:
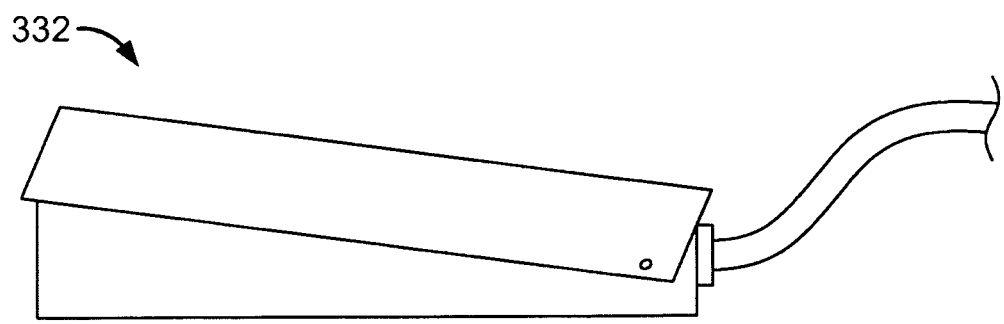

FIG. 17A is a side view of the foot switch.

Figure 17B:
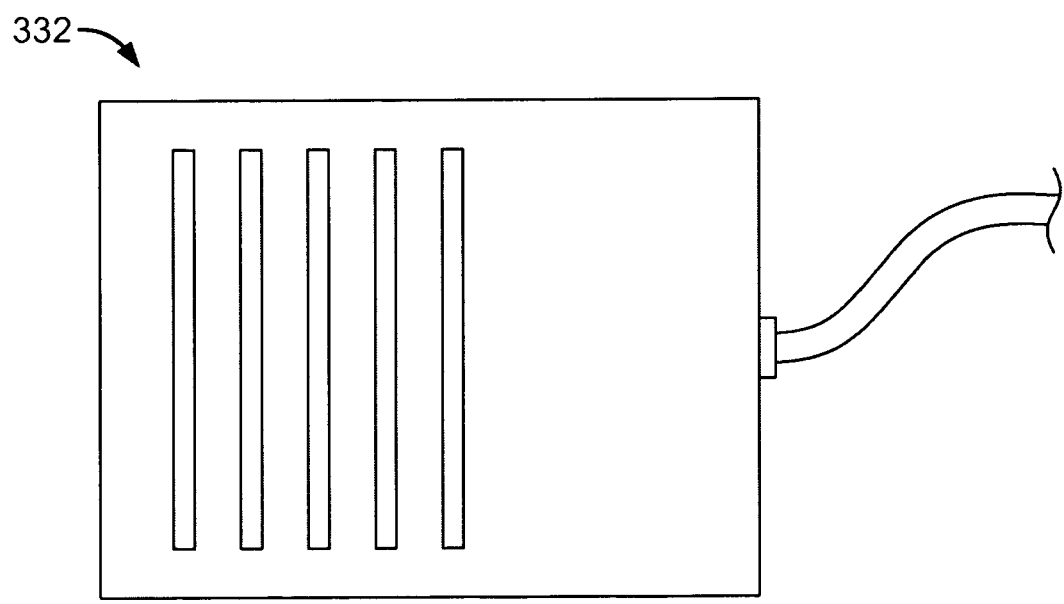

FIG. 17B is a top view of the foot switch.

Figure 18:
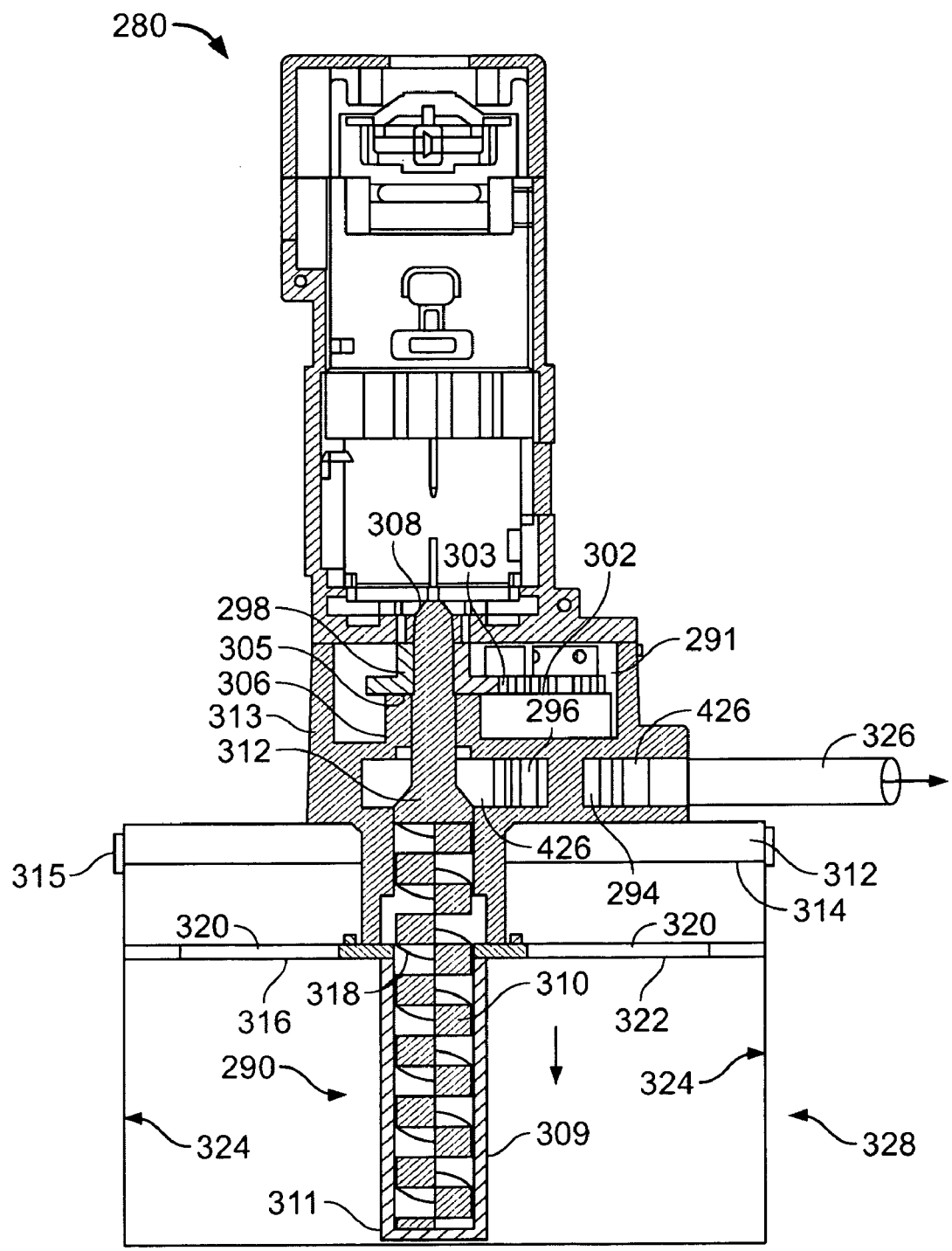

FIG. 18 is a side-sectional view of the pump along line 18—18 of FIG. 17.

Figure 19:
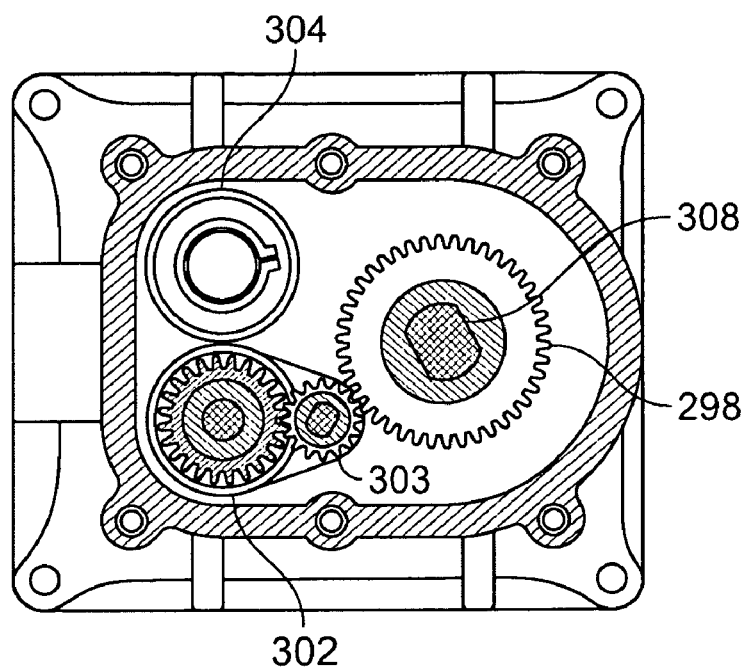
Figure 20:
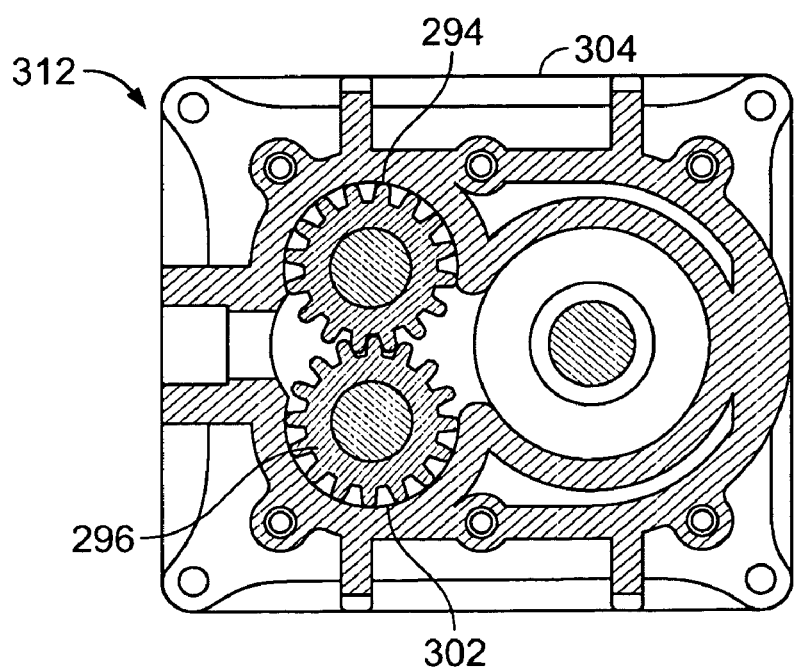

FIGS. 19 and 20 are cross-sectional views of the pump along lines 19—19 and 20—20 of FIG. 17.

Figure 20A:
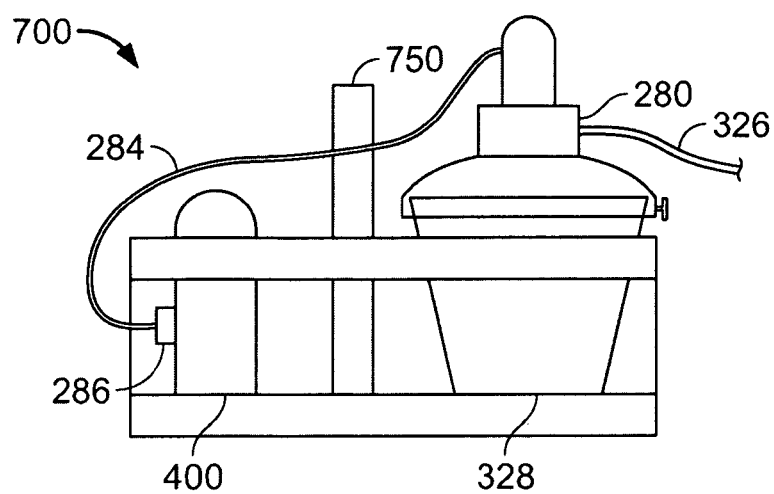
Figure 20B:
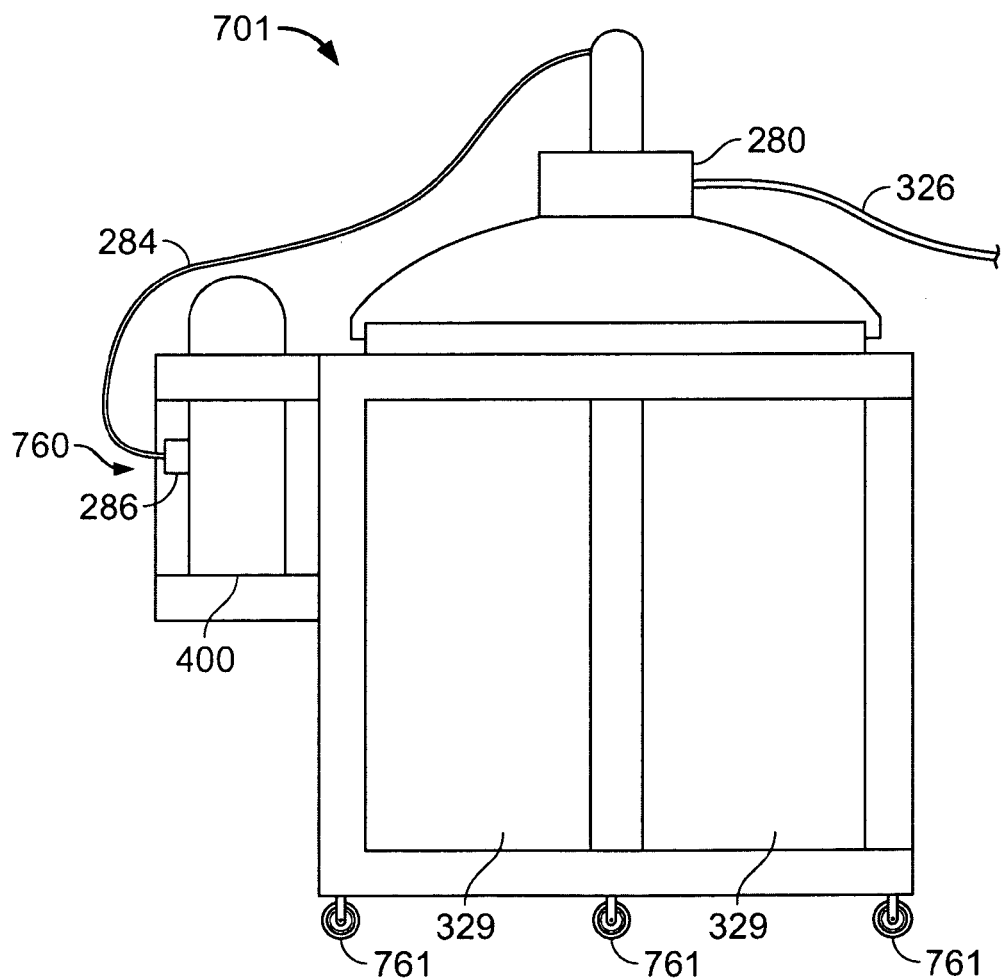

FIGS. 20A and 20B are side views of the container.

FIG. 21 is a three-dimensional view of an adaptor.

FIGS. 22 and 23 are three-dimensional views of the two pieces of the adaptor.

FIGS. 24 and 24A are schematic views of the adaptor in use.

Figure 25:
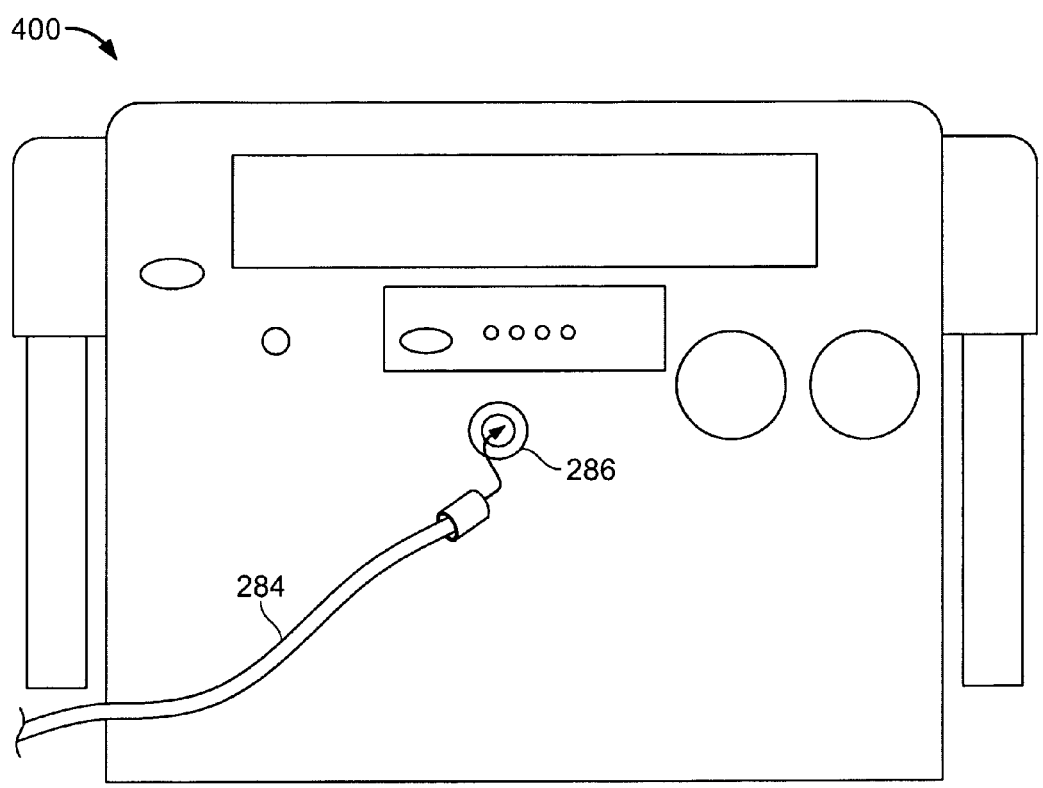

FIG. 25 is a side view of the battery and its electrical connector.

Figure 26:
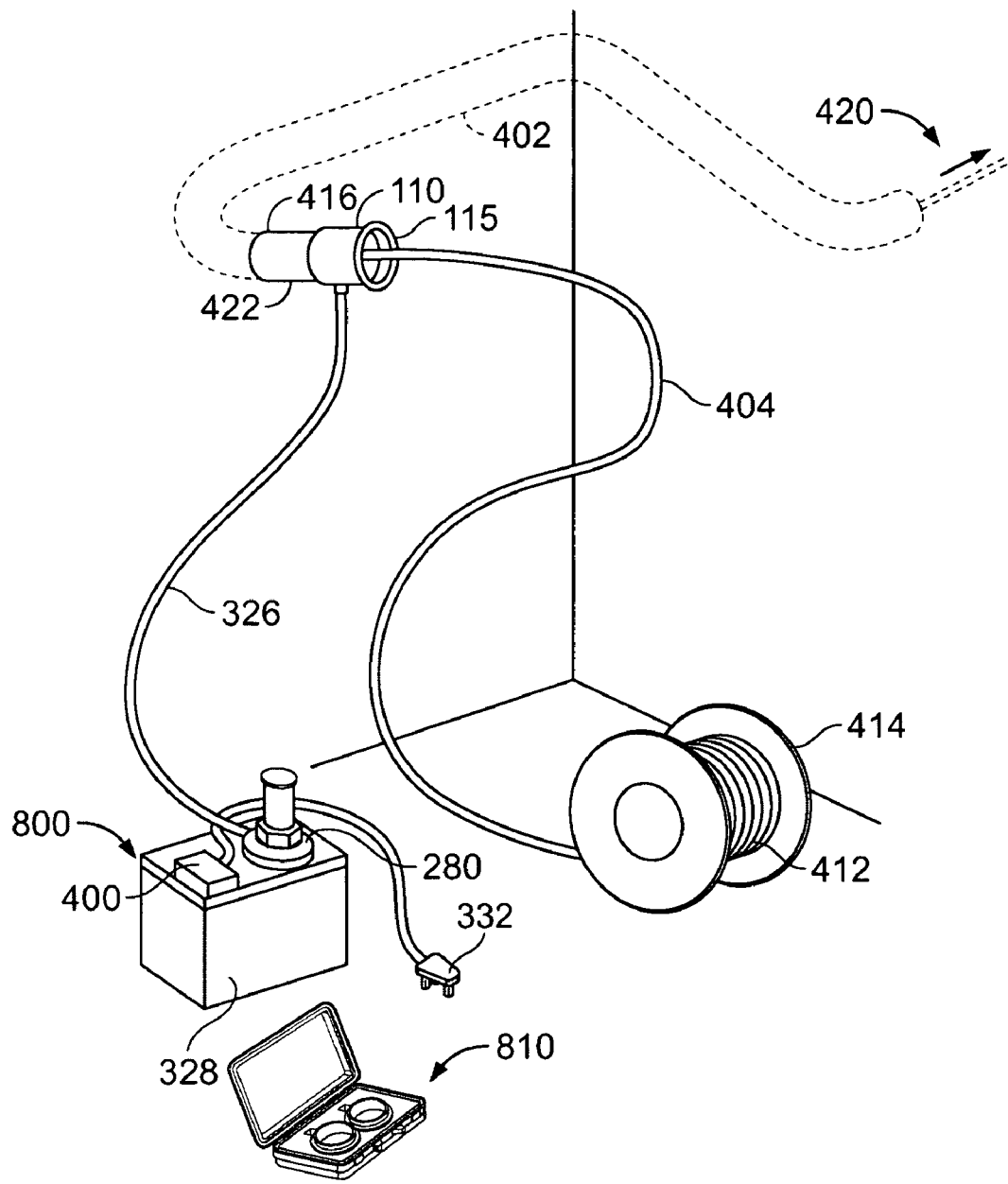

FIG. 26 is a three-dimensional view of a lubricator in use.

Figure 1:
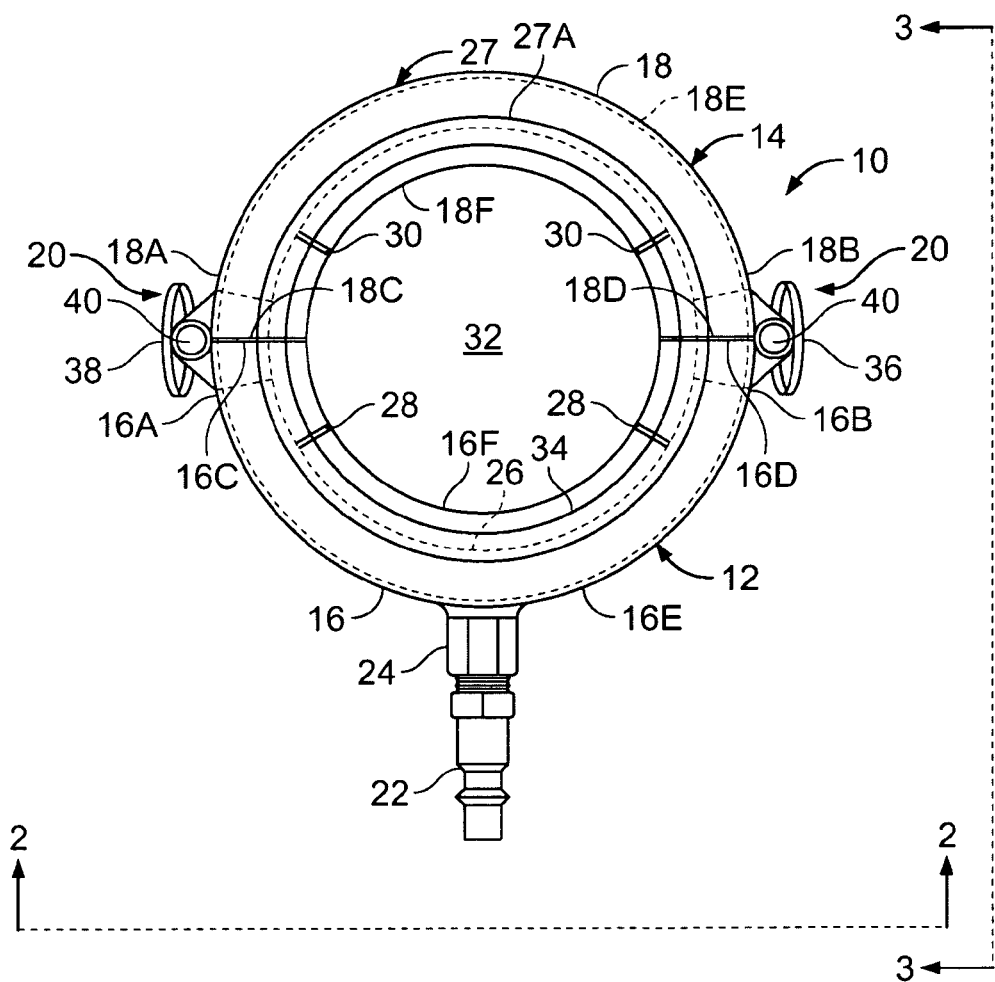
FIG. 1 is a top plan view of an automatic wire-lubricating device shown in an assembled condition.
Figure 2:
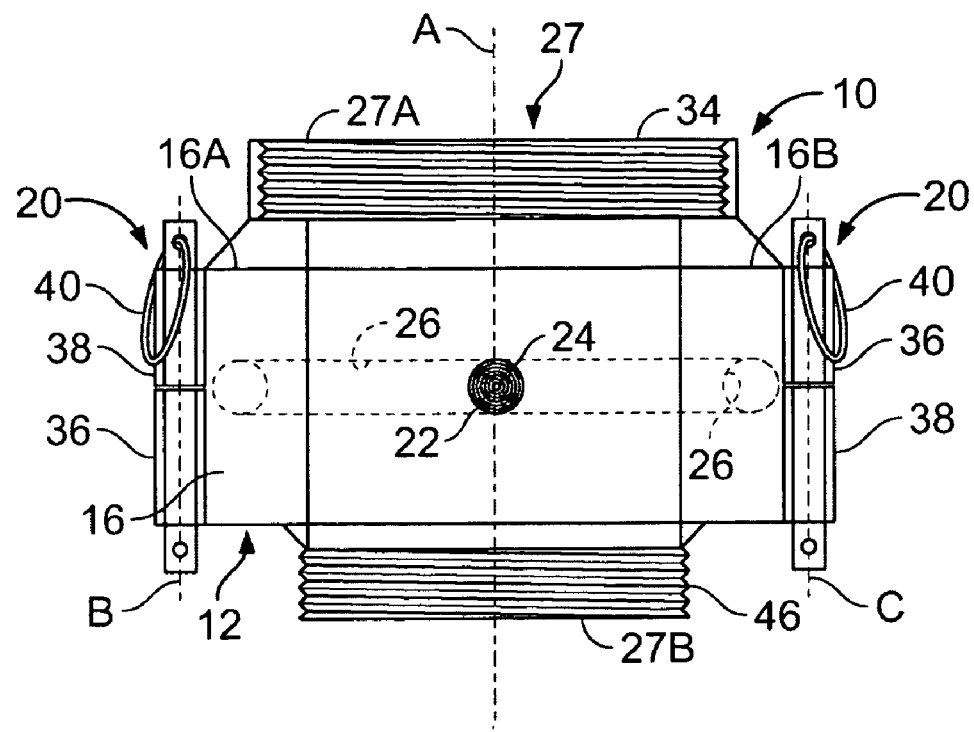
FIG. 2 is a side elevational view of the device as seen along line 2—2 of FIG. 1.
Figure 3:
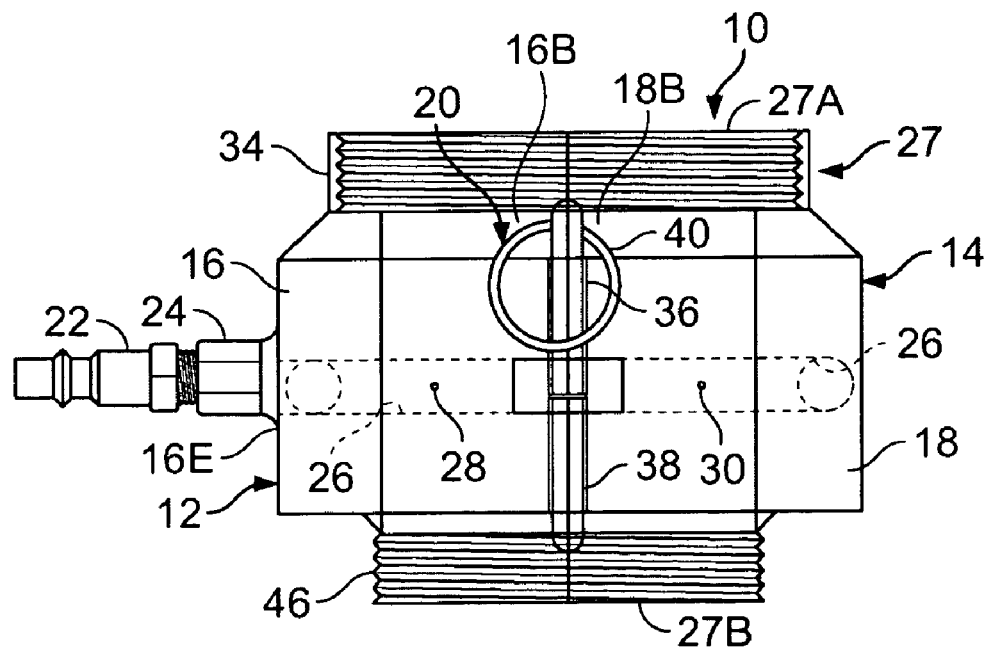
FIG. 3 is another side elevational view of the device as seen along line 3—3 of FIG. 1.

Referring to the drawings and particularly to FIGS. 1 to 3, there is illustrated an automatic wire lubricating device, generally designated 10, in an assembled form. The device 10 basically includes first and second components 12, 14, each forming a body section 16, 18 of generally arcuate and more particularly of semi-cylindrical configuration, and detachable fastening means 20 at the opposite angularly displaced ends 16A, 16B and 18A, 18B of the respective body 10, sections 16, 18 for releasably securing the first and second components 12, 14 together at flat end faces 16C, 16D and 18C, 18D to provide the device 10 in the assembled condition of FIGS. 1 to 3. The flat end faces 16C, 16D of the body section 16 lie in a common plane and likewise the flat end faces 18C, 18D of the body section 18 lie in a common plane, as clearly seen in FIGS. 4 and 7.

Figure 4:
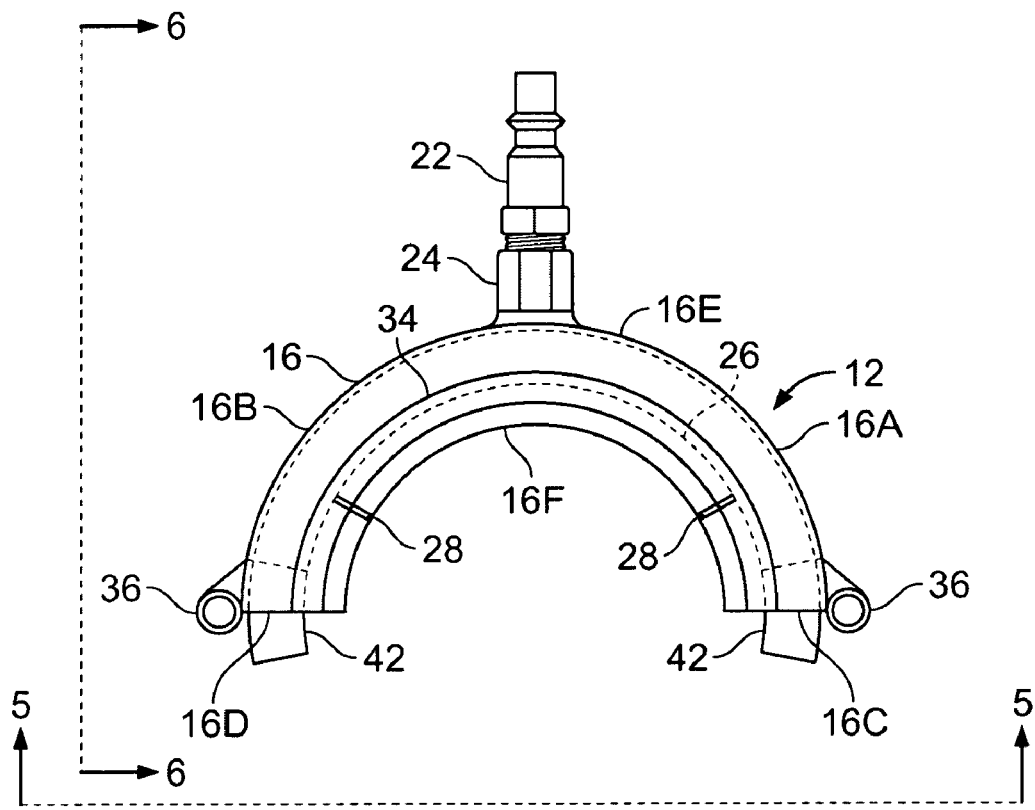
FIG. 4 is a top plan view of a first component of the device representing approximately one half of the device.
Figure 5:
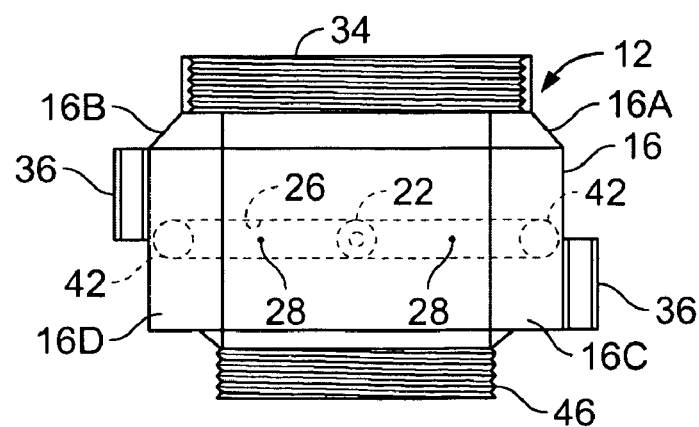
FIG. 5 is a side elevational view of the first component of the device as seen along line 5—5 of FIG. 4.
Figure 6:
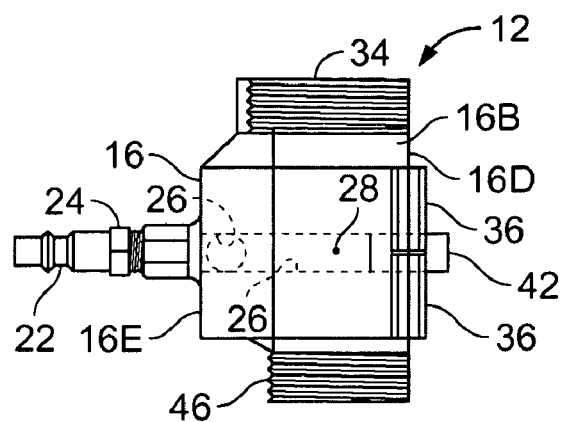
FIG. 6 is another side elevational view of the first component of the device as seen along line 5—5 of FIG. 4.
Figure 7:
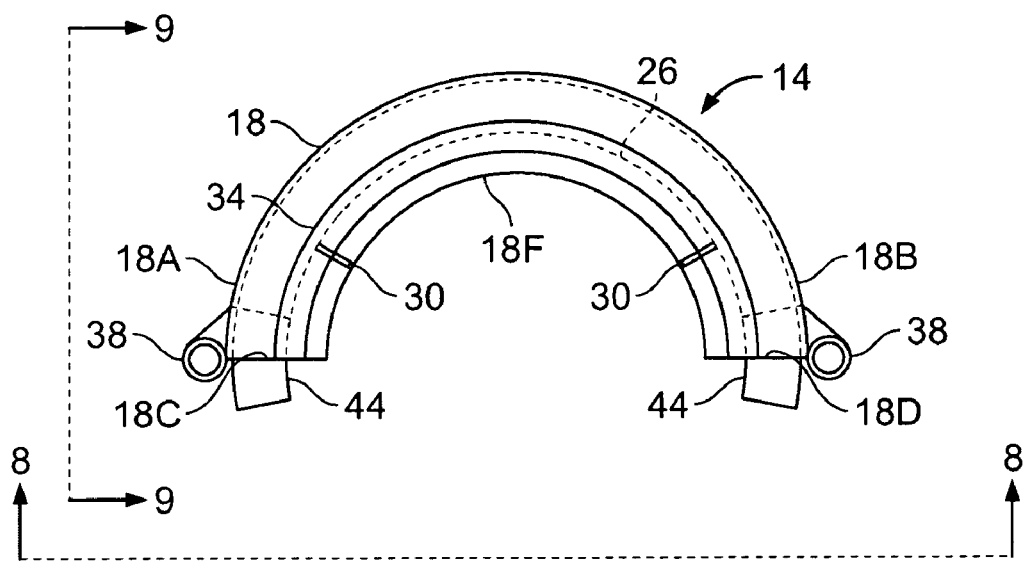
FIG. 7 is a top plan view of a second component of the device representing approximately the other half of the device.
Figure 8:
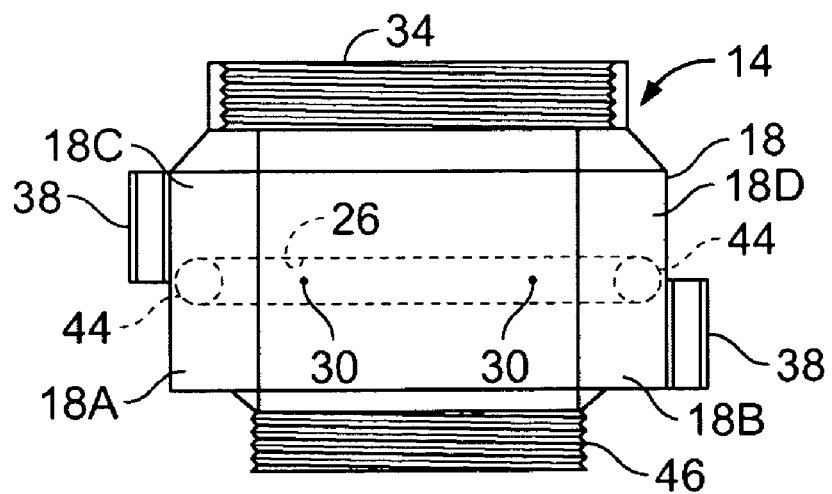
FIG. 8 is a side elevational view of the second component of the device as seen along line 8—8 of FIG. 7.
Figure 9:
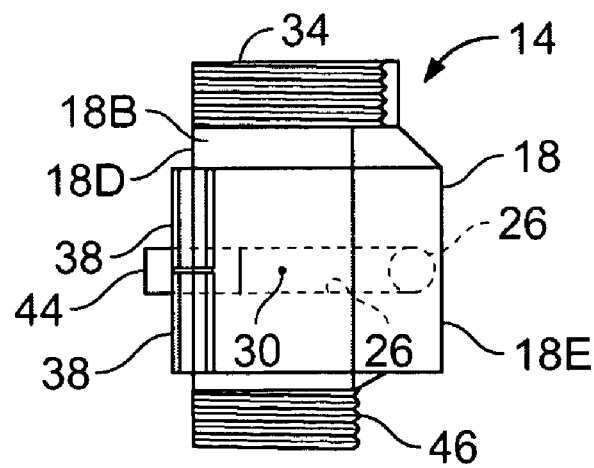
FIG. 9 is another side elevational view of the second component of the device as seen along line 9—9 of FIG. 7.

Referring also to FIGS. 4 to 9, there is illustrated the first component 12 by itself in FIGS. 4 to 6 and the second component 14 by itself in FIGS. 7 to 9. The first component 12 of the device 10 has a quick-connect member 22 which fits, such as by being screwed, into a pipe fitting 24 (such as ¼ inch in size) being attached, such as by being welded, onto an outer circumferential side 16C of the body section 16 of the first component 12. The quick-connect member 22 can easily and quickly be attached to a soap line (not shown) coming from a pump (also not shown). The body sections 16, 18 of the respective first and second components 12, 14 together form an annular body 27 open at its axially displaced opposite ends 27A, 27B with each body section 16, 18 defining one half of a continuous cylindrical interior reservoir 26 in the annular body 27, as seen in FIGS. 1–3, when the first and second components 12, 14 are fastened together. The continuous interior reservoir 26 is in flow communication with the quick-connect member 22 and pipe fitting 24 on the first component 12. The body sections 16, 18 also have respective dispensing or applicator holes 28, 30 defined through the interior walls portions 16D, 18D thereof which provide flow communication between the interior reservoir 26 and a central opening 32 formed through the annular body 27 of the device 10 by the first and second components 12, 14 thereof when the latter are fastened together. The annular body 27 being of cylindrical configuration has a longitudinal central axis A, as seen in FIG. 2, extending through the central opening 32 and between the opposite ends 27A, 27B of the annular body 27.

The first and second components 12, 14 additionally have formed on their body sections 16, 18 at one of the axially displaced opposite ends 27A of the annular body 27 respective halves of an internally threaded cylindrical clamping flange 34 which is concentric about the longitudinal central axis A of the annular body 27. Also, the detachable fastening means 20 are disposed adjacent to the outer circumferential sides 16E, 18E and the flat end faces 16C, 16D and 18C, 18D at the respective angularly displaced ends 16A, 16B and 18A, 18B of the body sections 16, 18. The detachable fastening means 10 include pairs of sleeves 36, 38 and pins 40. The sleeves 36, 38 are hollow for receiving the respective pins 40. The sleeves 36 at the respective ends 16A, 16B of the body section 16 and the sleeves 38 at the respective ends 18A, 18B of the body section 18 are axially offset relative to one another, extend substantially equidistantly in opposite directions relative to the continuous interior reservoir 26 in the annular body 27, and partially project beyond the respective flat end faces 16C, 16D or 18C, 18D, as seen in FIGS. 1 and 4–9. When the first and second components 12, 14 are assembled together at the flat end faces 16C, 18C and 16D, 18D of the body sections 16, 18, the sleeves 36, 38 at corresponding ones of the ends 16A, 18A and 16B, 18B of the body sections 16, 18 are disposed in pairs and aligned axially with one another along opposite side axes B, C, which extend substantially in a parallel relationship to the longitudinal central axis A of the annular body 27 and lie substantially in a common plane formed by said flat end faces, as seen in FIGS. 1–3. The pins 40 are slidably inserted through the pairs of aligned hollow sleeves 36, 38 so as to hold the two body sections 16, 18 of the first and second components 12, 14 together. For taking the first and second components 12, 14 apart, the pins 40 can be slidably withdrawn from the pairs of aligned sleeves 36, 38 in the same reverse direction along the respective parallel side axes B, C of the aligned sleeves 36, 38.

Further, coupler pins 42, 44 of hollow construction and slightly arcuate shape are attached at the flat end faces 16C, 16D and 18C, 18D of the angularly displaced opposite ends 16A, 16B and 18A, 18B of the body 15 sections 16, 18 of the first and second components 12, 14 so as to project outwardly from the flat end faces 16C, 16D and 18C, 18D and provide communication between the opposite ends of the halves of the interior reservoir 26 defined by the body sections 16, 18. The hollow coupler pins 42, 44 have O-rings 45 disposed around them and the coupler pins 42, 44 fit together so as to make a tight seal between the halves of the interior reservoir 26 where the flat end faces 16C, 16D and 18C, 18D of the body sections are placed flush together when the first and second components 12, 14 are fastened together.

The device 10 is connected to and held in place on a threaded end of a conduit (not shown) by attaching the two halves of the internally threaded cylindrical clamping flange 34 about the threaded end of the conduit as explained above by inserting the pins 40 into the aligned sleeves 36, 38. When a pump feeds liquid soap through the quick connect member 22 into the interior reservoir 26, the liquid soap travels 360 degrees through the interior reservoir 26 around the device 10 and squirts out through the interior dispensing or applicator holes 28, 30 onto the wire being pulled through the central opening 32 of the device 10 into the threaded end of the conduit.

The first and second components 12, 14 additionally have formed on their body sections 16, 18 at the other of the axially displaced opposite ends 27B of the annular body 27 respective halves of an externally threaded cylindrical nipple 46 which is concentric about the longitudinal central axis A of the annular body 27. The nipple 46 allows the attachment of a member such as a bushing thereon to keep from scaring the wire or a rubber grommet for ensuring a "no mess" application of soap on the wire during a vertical pull thereof.

The actual physical size of the device 10 depends on the trade size of the conduit one is pulling wire through, resulting in a different size device for each trade size of conduit. Also, it should be understood that the device 10 can be manufactured by various suitable conventional methods using various suitable conventional materials and having various different configurations.

In summary, the automatic wire-lubricating device 10 is a double pin clamping device that clamps over all trade size conduits and has a small male adapter or quick-connect 22 that connects to either a manual or electrical pump for supplying liquid soap into the device 10 and has a plurality of interior holes 28, 30, such as four in number, from which liquid soap is dispensed evenly and completely over the wire so as to lubricate the wire as it is pulled through the central opening 32 of the device 10. The advantages of the device 10 are: (1) mess free application; (2) less cleanup; (3) less manpower required; (4) less expense; and (5) more consistent job of lubricating the wire being pulled.

As shown in FIG. 10, in another example of a lubricator 110, two ribbed, semi-cylindrical pieces 116 and 118 can be fastened together (and unfastened) by detachable pins 120, 121 to mount (and remove) the lubricator, made of a material such as plastic, onto an externally threaded end 123 of a conduit 125.

By conduit, we mean in the broadest sense any kind of pipe, tube, sleeve, or other elongated element that has been fabricated in any manner using any continuous or discontinuous material and that has a channel or lumen within which one or more strands extend. One specific example of a conduit is a metal pipe used to carry electrical wires in a building. By strand we mean, in the broadest sense, a wire, cable, thread, braid, fiber, or other elongated element that has been fabricated in any manner using any material and may extend within a conduit alone or together with multiple strands equal in length. We sometimes use strand to refer to more than one strand.

The lubricator bears an internal thread 112 and an external thread 114. The internal thread and the external thread may be of the same pitch and diameter (which is useful in connection with attachment of a bushing described later) or may be of different pitches and diameters. The threads are shown in the figure as being aligned on a common axis, but they could also be aligned on different axes that are either parallel to one another or at an angle to one another.

The internal thread 112 enables the mating of the lubricator 110 with the externally threaded end 123 of the conduit 125. The external thread 114 enables the attachment of a conventional (or special) internally-threaded 117 protective bushing 115 to the lubricator 110. The bushing has a leading edge 103 that is, for example, smooth and rounded to protect a strand against abrasion and damage when it is pulled through the bushing. A hose (not shown) that carries a lubricant pumped from a supply (not shown) attaches to a pipe-fitting, using a quick-connect coupling (not shown).

The fitting and coupling can be of the kind shown and described in FIGS. 1, 2, and 3. Lubricant that is pumped from the supply into the lubricator exits through dispensing holes 128 (only one is shown in FIG. 10) that open on an interior surface of the lubricator 110.

Figures 11, 11A:
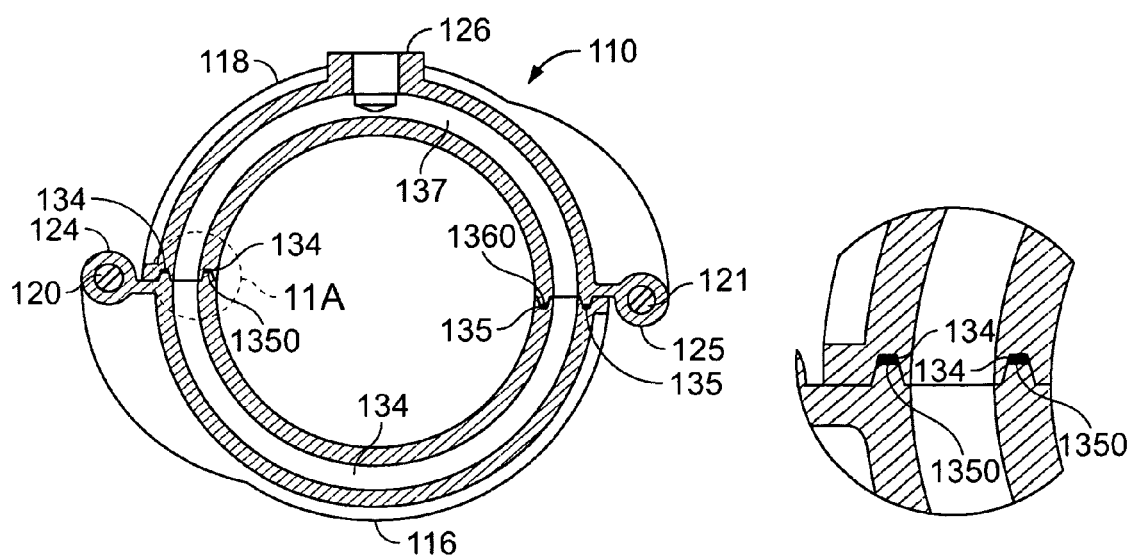
FIG. 11 is a cross-sectional view of the lubricator along line 11—11 of FIG. 10.

FIG. 11 shows a cross-section of the lubricator at 11—11 of FIG. 10. When the semi-cylindrical pieces 116, 118 are closed together, they may be fastened together by pins 120, 121 placed through the sleeves 124, 125. Within each of the pieces 116 and 118 and at locations near the sleeves 124, 125 are, in this instance, rings of silicon packing 134, 135, lying at the bottom of the grooves 1350, 1360, which assure a tight seal of the mating ends of annular tubes 137, 139 to form an interior reservoir that carries lubricant from the pipe fitting to the dispensing holes 128 (FIG. 10).

As shown in FIGS. 12 and 13, the lubricator 110 includes a removable, annular brush 144 shown in detail in FIG. 14 that is used to prevent leakage of the lubricant from the lubricator as the strand is being lubricated. When the amount of the lubricant fed from the dispensing holes onto the strand is more than is needed to lubricate the strand, the excess is retained in the chamber that is between the brush bristles and the end of the conduit.

The brush includes two semi-circular half-brushes 139, 141, each having a metal semi-circular ring 146, 148 (FIG. 14) that is held within a corresponding semi-circular groove 136, 138 that is formed in the interior wall 150, 152 of each piece 116, 118 of the lubricator 110. The semi-circular grooves are offset from one another along the axis of the lubricator so that when the two pieces of the lubricator are closed to mount the lubricator on the conduit, the bristles of the two halves will not engage one another in a way that makes closing the two pieces more difficult.

The semi-circular rings of the brush are configured to slide within the grooves to permit the halves of the brush 146, 148 (FIG. 14) to be removed for replacement by sliding. The replacement half-brushes 146, 148 are then fit snuggly in place after having been slid onto the semi-circular grooves 150, 138. Smaller versions (for example, smaller than 1½ inches in diameter) of the lubricator do not require a brush because they do not tend to leak lubricant. Those smaller lubricators resemble that of FIGS. 12 and 13, except for the absence of a groove for attaching a brush. Retaining clips 710, 720 hold the brush in place when the lubricator is separated into halves.

As FIGS. 14 and 14A show, each of the half brushes is semi-circular. One end of each of the bristles 160 is held in a the semi-circular ferrule 146 (bristles are not shown with the ferrule 148 ), which has a configuration that fits the lubricator groove 136. The other end of each of the bristles projects toward the axis of the ring. There are enough bristles in the brush to assure that the lubricant has difficulty leaking through the brush.

Because conduits vary widely in diameter, it is useful to have a variety of sizes of lubricators available. The lubricators of different sizes can be provided in sets. A set could include all of a wide range of sizes of lubricators (for example, twelve different lubricators ranging in internal diameter from ½ inch to 6 inches) or the lubricators can be organized in smaller sets that relate to specific size-ranges of conduits, for example, a set for smaller diameter conduits and a set for larger diameter conduits. The lubricators of a set can be housed in a holder such as the holders 170, 171, 172 for each of the sets 174, 176, 178 of lubricators 161–168, 910–913, as shown in FIGS. 15, 15A, and 16. The holder provides a convenient way to transport and store the set and prevents lubricant on the lubricators from either drying out or leaking out of the holder.

Each of the holders 170, 171, 172 is a closable container that includes a body 173, a lid 175, and a seal 177 between the body and lid. The lubricators 161–168, 910–913 come in small 178 (lubricators with diameters of ½, ¾, 1, 1 ¼, 1½, and 2 inches), medium 176 (with diameters of 2½, 3, 3½, and 4 inches), and large 174 (with diameters of 5 and 6 inches) sets, with each set containing at least two lubricators. Each lubricator 161–168, 910–913 sits in a separate receptacle 181–188, 920–923. When the lid of a holder is closed on the body and latched, the seals make the holder 170, 171, 172 airtight.

Each set contains at most six lubricators. A set includes a holder with appropriately sized receptacles each configured for one of the lubricators within the set; all the lubricators within one set are of a different size than all the lubricators within another.

Similarly, the receptacle for each lubricator is contoured to match at least a part of the lubricator to keep the lubricator in its place.

All of the lubricators of a set (and of all sets) share a common size and type of pipe-fitting and quick-connect coupling to accommodate one size of hose that extends from the pump.

As shown in FIG. 17, a pump 280 transfers the lubricant from a supply to the lubricator through a connecting hose (not shown in FIG. 17, 326 in FIG. 18). Using an auger 290 rotating within an auger tube (not shown in FIG. 17, 309 in FIG. 18), the pump forces a viscous lubricant from a standard bucket (not shown in FIG. 17, 328 in FIG. 18) in which the supply is held to an internal reservoir (hidden in FIG. 17) of the pump where the lubricant is held. The lubricant could be a viscous or non-viscous material, for example, a soap, a detergent, an oil, or a grease. The assembly also contains two meshing gears that form a gear pump. The gear pump forces the lubricant from the reservoir 138 into a hose (not shown in FIG. 17; 326 in FIG. 18), which then carries the lubricant to the lubricator. The auger 290 and the meshing gears (hidden in FIG. 17) of the pump are driven by a commercially available motor (not shown; available from Black & Decker in Kansas City, Mo.). The pump operator turns the motor on or off using a foot switch (not shown in FIG. 17, 332 in FIGS. 17A, 17B, and 26; also available from Linemaster Corporation in Woodstock, Conn.). The speed of the motor is controlled by a three-speed transmission, which controls the amount of lubricant dispensed onto the strand. The motor is powered by a battery (not shown in FIG. 17, 400 in FIG. 25).

The battery may be a standard 12-Volt battery held in a commercially available portable emergency housing (for example, available from Team Products International in Parsippany, N.J.). An electrical connector 286 (FIGS. 20A, 20B and 25) may be added to the housing of the battery to permit quick, reliable, repeated connection or disconnection of a cable 284 (FIGS. 20A, 20B, and 25) between the battery 400 (FIG. 25) and the pump 280.

As shown in FIG. 18, within the reservoir 291 of the pump 280, the upper end of the shaft of the auger is housed together with the meshing gears 294, 296 of the gear pump so that when the lubricant is drawn into the reservoir by the auger, the lubricant will be picked up by the meshing gears and pumped to the supply line 326. As shown in FIG. 19, above the reservoir, one of the meshing gears is driven by a drive gear 302, which in turn is driven by an intermediate gear 303, which in turn is driven by an auger gear 298 that is connected to the upper end of the auger shaft 306. The upper end of the auger shaft is keyed 308 to the auger gear. The keyed upper end of the auger shaft (at a location above the auger gear) is driven by the motor. The gear ratio effected by the auger gear, the intermediate gear, and the drive gear is arranged to tend to force an oversupply of lubricant into the reservoir 426 relative to the flow of the lubricant from the reservoir to the supply line.

The auger 290 has a screw portion 310 arranged along its length, and a tubular sleeve 309 around the screw that defines a channel from the tip of the auger 311 to the top of the auger 312. During operation, as the auger is driven by the motor, lubricant is drawn up from the supply bucket into the reservoir 426. The meshing gears 294, 296 force the lubricant out of the reservoir 426 and into the connecting hose 326, to be dispensed by the lubricator (for example, the lubricator shown in FIG. 10) onto a strand.

The block 312 that contains the reservoir is bolted to a flange 314 that serves as a substitute lid for the supply bucket. The flange 314 is round and has a peripheral wall 315 that is sized and configured to mate with the opening of the bucket and supports the pump 280 that sits atop it. Inside the bucket, a follower plate 316, with a hole 318 slightly larger in diameter than the diameter of the auger tube can slide freely down the auger tube as the lubricant is pumped out. The follower plate 316 has a steel center disk 320 and a flexible outer ring 322 that wipes the inner wall 324 of the bucket as the follower plate descends. As the lubricant is pumped out of the bucket, the follower plate descends by gravity, wiping the inner wall clean and causing the remaining supply of lubricant to lie in a compact cylindrical mass on the bottom of the bucket. This arrangement assures that the auger can pump effectively until all of the lubricant is removed.

The auger may be made of steel or a polymeric material.

FIGS. 20A and 20B show side views of two containers 700, 701 that hold the battery 400, pump 280, and either a one-gallon (FIG. 20A) or a five-gallon (FIG. 20B) supply bucket 328, 329. The battery 400 is connected to the pump 280 by a cable 284 attached to an electrical connector 286. The pump 280, in turn, is connected to the lubricator (not shown) by a hose 326. For the one-gallon supply bucket 328 in FIG. 20A, both the pump 280 and supply bucket 328 sit within the same container 700 as the battery 400. A handle 750 allows for the container 700 to be carried by hand. For the five-gallon supply bucket 329 in FIG. 20B, the battery 400 sits in a separate compartment 760 from the pump 280 and supply bucket 329. This container 701 is transported on casters 761. Both are metal containers 700, 701 that prevent leakage of lubricant when the assembly is transported.

In some situations, the near end of the conduit lacks threading, such as when the conduit is held in a wall 502 of a manhole 504 with the end 506 of the conduit held near the inside of wall 508, as illustrated in FIGS. 24 and 24A. In such a situation, an adaptor 516 may be mounted on the near end of the conduit to provide a threaded end onto which the lubricator 110 may be screwed. The adaptor 516 has two semi-cylindrical halves 530, 550 that, when mated, form an annular body 516. The smooth end 518 of the adaptor slides into the conduit while the threaded end 520 receives the lubricator 110. The outer wall 522 of the adaptor is tapered so that the adaptor slides easily into conduits of slightly different inner wall diameters and can be jammed into the conduit to hold it securely during the pulling operation. Once lubrication is completed, the lubricator 110 is removed from the adaptor 510 by detaching the semi-cylindrical halves of the coupling 530, 550; similarly, the adaptor 510 slides out from the conduit 580 and the adaptor's semi-cylindrical halves 530, 550 are subsequently separated from each other.

As shown in FIG. 22, a piece 530 that forms half of the manhole adapter has a semi-cylindrical upper section 532, which includes external threads 534 that are sized to accept the internal threads of one end of a lubricator (for example, the lubricator shown in FIG. 10), and a semi-cylindrical lower section 536, which includes a tapered wall 538. The diameter of the lower section 536 enables it to fit with a conduit (not shown) that is mounted within a wall of a manhole. The taper is represented by an offset 540 of the outer surface of section 540 relative to an imaginary line 544 that is a line with the central axis (not indicated) of the adaptor. Two notches 546, 548 in the edges of piece 530 are configured to mate with two plugs 566, 568 of the other half of the adaptor (shown in FIG. 23) to form the complete adaptor (shown in FIG. 21) and to prevent relative motion of the receptive two halves of the adaptor along the central axis.

Likewise, as shown in FIG. 23, a piece 550 that forms the other half of the manhole adaptor also has a semi-cylindrical upper section 552 and has essentially the same configuration as the piece 530 shown in FIG. 22, except that it has two plugs 566, 568 configured to mate with two notches 546, 548 of the other half of the adaptor (shown in FIG. 22) to form the complete adaptor (shown in FIG. 21) and to prevent relative motion of the receptive two halves of the adaptor along the central axis.

FIG. 25 shows a standard 12-Volt emergency battery 400 with its electrical connector 286 and an electrical connecting cable 284; in this illustration, the battery is not attached to the pump's motor.

As shown in FIG. 26, in use, the battery 400 is electrically connected by the cable to the motor within the pump 280. A lubricator 110 is attached to a conduit 402, through which a strand 404 is being pulled. A hose 326 connects the lubricator 110 to the pump 280 that sits atop a standard supply bucket 328 filled with lubricant. A foot switch 332 controls the connection of the battery 400 to the motor, while a three-speed transmission controls the motor's speed to regulate the rate at which lubricant is pumped onto the strand 404.

As shown in FIG. 26, in use, the electrician brings to the job site the container 800 that holds the bucket of lubricant and the pump and also brings the holder 810 that contains the lubricator to be used on the job. Assume that an insulated wire 404 from a supply 412 is to be pulled from a supply spool 414 at a near end 416 of the conduit through a steel conduit 418 to the other end 420. The electrician takes the lubricator that is of the correct size for the conduit from the holder and mounts it on the end of the conduit either by screwing it onto the external threads or by removing one of the pins, opening the lubricator and then closing it over the end of the conduit and replacing the pin. If a standard bushing 422 has not previously been mounted on the other end of the lubricator, the electrician screws it onto the threads.

From the other end of the conduit a stiff wire is forced through the conduit to the near end. A free end of the wire to be pulled is then attached to the free end of the stiff wire. If not already done, the electrician attaches the foot switch to the motor of the pump and places it in a convenient location. If not already done, he mounts the pump on the top of the bucket of lubricant. He connects one end of a supply line to the outlet of the pump and the other end of the supply line to the quick-release coupling of the pump. He connects the battery connector to the pump using an electrical cable.

The stiff wire at the far end of the conduit is pulled to begin to pull the insulated wire into the near end of the conduit. The electrician steps on the foot switch to begin to force lubricant into the supply, into the reservoir in the lubricator, and from the reservoir into the chamber that lies between the brushes and the near end of the conduit. With the lubricant flowing, the electrician draws a supply of the insulated wire from the spool as the stiff wire is pulled from the far end of the conduit. As the insulated wire passes through the conduit, the outer wall of the wire is automatically coated with lubricant from the supply that is built up in the chamber next to the brushes. The electrician at the same time can both feed wire from the spool and control the speed of lubricant pumping using the foot switch to control the motor speed. If the rate of pumping is too high, lubricant may begin to be forced through the brush. The electrician could then reduce the motor speed. If the rate of pumping is too low, the wire will not feed easily through the conduit, and the electrician can increase the rate of pumping.

The gear pump is capable of very high pumping pressures (e.g., as high as 2500 psi). In combination with the auger approach of drawing lubricant from the bucket, this makes it possible to successfully pump extremely viscous lubricants from the bucket and feed them into the lubricator.

When the end of the insulated wire has been pulled through the conduit and extends as far as needed from the far end of the conduit, the electrician can stop the pump. The next step is to unscrew the bushing from the end of the lubricator. Then the lubricator is removed from the end of the conduit by removing one of the pins and opening the two halves. Once the lubricator has been removed, the bushing, which has the insulated wire running through it and has been held near the end of the conduit, is screwed onto the end of the conduit to complete the wire-pulling job.

The lubricator can then be returned to the holder without cleaning it, and the pump with bucket and the battery can be returned to the carrier also without cleaning them.

With use, the half-brushes may become worn or damaged and need to be replaced. Replacement is done simply by sliding the metal ring ferrule along the groove in which it is held until it is free and then reversing that step using the replacement brush.

Although particular implementations have been described above, other implementations are also within the scope of the following claims.

For example, the lubricator can be mounted on the conduit and the bushing can be mounted on the lubricator using mechanisms other than threads.

The invention claimed is:

1. Apparatus comprising
a pump to force a viscous lubricant from a supply to a lubricator at which the lubricant is to be dispensed onto a strand that is being pulled through a conduit, the pump including a gear pump,
a battery-powered motor to drive the gear pump, and
a foot pedal to control the motor.

2. The apparatus of claim 1 in which
the motor has different transmissions to vary the amount of lubricant applied to the strand.

3. The apparatus of claim 1 in which the gear pump comprises a pair of gears to force the lubricant from a reservoir to an outlet for a supply hose.

4. The apparatus of claim 3 also including a mechanism to feed lubricant from the supply to the reservoir.

5. The apparatus of claim 4 in which the mechanism comprises an auger.

6. The apparatus of claim 5 in which the auger is geared to the gear pump.

7. The apparatus of claim 5 in which the auger is driven to oversupply the reservoir relative to the amount of lubricant being pumped by the gear pump.

8. The mechanism of claim 1 also comprising the lubricator.

9. The mechanism of claim 8, in which the lubricator comprises a plastic material having embedded channels that carry the lubricant under pressure from an inlet to outlets at which the lubricant is dispensed.

10. The apparatus of claim 9 in which the plastic comprises glass-filled polypropylene.

11. The apparatus of claim 9 in which the lubricator comprises two plastic pieces.

12. The apparatus of claim 9 also including ribs formed on an outer surface of the lubricator.

13. The apparatus of claim 8 in which the lubricator includes
a brush to prevent the lubricant from leaking out of the lubricator,
the brush being removable from the lubricator for replacement when the brush is worn.

14. The apparatus of claim 13 in which the brush includes bristles arranged in a ring, an end of each of the bristles being held in a ring-shaped ferrule.

15. The apparatus of claim 14 in which the lubricator includes a receptacle into which the ring-shaped ferrule can be inserted and removed for replacement.

16. The apparatus of claim 15 in which the lubricator includes a groove to mate with the ferrule.

17. The apparatus of claim 13 in which the brush is removable by sliding a portion of the brush with respect to a portion of the lubricator.

18. The apparatus of claim 13 in which the brush defines a chamber between the brush and the conduit when the lubricator is mounted on the conduit, and the lubricant includes outlets configured to dispense lubricant into the chamber.

19. The apparatus of claim 3 also comprising
a set of lubricators, each of the lubricators being configured to apply a lubricant to a strand as it is pulled through a conduit, the lubricators being respectively configured for use with different sizes of conduit, and
a holder having receptacles that are each sized to hold one of the lubricators of the set.

20. The apparatus of claim 19 in which there are fewer than six lubricators in the set.

21. The apparatus of claim 19 in which the set includes at least two subsets of the lubricators, and also including a second holder having receptacles that are each sized to hold one of the lubricators of one of the subsets, the lubricators of one of the subsets all being larger than any of the lubricators of the other of the subsets.

22. The apparatus of claim 19 in which the holder comprises an airtight container that is sealed to prevent the lubricant from drying out.

23. The apparatus of claim 3 also comprising
a container for the lubricator, including
a receptacle that is configured to match a configuration of at least part of the lubricator to hold the lubricator in place as the container is moved, and
a seal to prevent the lubricant from leaking outside the container.

24. The apparatus of claim 23 in which the container includes a body and a lid and the seal is between the body and the lid.

25. The apparatus of claim 3 also comprising the lubricator, in which the lubricator comprises
two separable pieces that are joined to mount the lubricator around the strand,
a reservoir that holds a supply of a lubricant, the reservoir being split between the two separable pieces, and
a seal to seal the reservoir when the two pieces are joined, the seal comprising a silicone packing mounted in at least one of the pieces.

26. The apparatus of claim 25 in which the reservoir comprises a ring-shaped tube that is formed in a wall of each of the two separable pieces, the tube being split when the pieces are not joined.

27. The apparatus of claim 3 also comprising an adaptor to adapt an end of a conduit to enable it to receive a coupling of the lubricator when the end of the conduit is held in a wall of a manhole, the adaptor including an annular body having one end to insert into the end of the conduit and another end having a coupling to receive the coupling of the lubricator.

28. The apparatus of claim 27 in which the coupling of the adaptor comprise threading.

29. The apparatus of claim 27 in which the one end of the annular body is tapered.

30. The apparatus of claim 27 in which the adaptor comprises two pieces.

31. The apparatus of claim 27 in which the two pieces comprises halves of a cylinder.

32. The apparatus of claim 27 in which the adaptor is formed of plastic.

33. The apparatus of claim 1 also including an auger to feed the gear pump from a supply.

34. An apparatus comprising
a pump to force a lubricant from a standard-sized bucket of lubricant to a lubricator at which the lubricant is to be dispensed onto a strand that is being pulled through a conduit, the pump including a flange configured to mate with an opening of the bucket and support the pump above the bucket, and
an auger that draws lubricant from the bucket, the auger being driven by a motor, the motor being mounted above the flange, the auger projecting below the flange.

35. The apparatus of claim 34 also including a follower plate that has an aperture sized to accommodate the auger and to permit the follower plate to slide up and down along the auger, the follower plate having outer edge configured to match an inner side wall of the bucket and configured to slide up and down a suction pipe around the auger.

36. The mechanism of claim 34 also comprising the standard-sized bucket of lubricant.

37. A method comprising
drawing a lubricant from a supply to a reservoir using an auger,
forcing the lubricant from the reservoir between two meshing gears into a supply line, and
delivering the lubricant through the supply line to a lubricator to apply a lubricant to a strand as it is pulled through a conduit.

38. The method of claim 37 also including driving the two meshing gears and the auger from a single motor.

39. The method of claim 38 in which the auger and the two meshing gears are driven at relative speeds to cause the auger to oversupply the reservoir relative to the rate at which the lubricant is forced from the reservoir into the supply line.

40. Apparatus comprising
- a lubricator at which lubricant is to be dispensed onto a strand that is being pulled through a conduit,
- a pump to force a viscous lubricant from a supply to the lubricator, the pump comprising a pair of gears to force the lubricant from a reservoir to an outlet for a supply hose,
- a battery powered motor to drive the pump, the motor having different transmissions to vary the amount of lubricant applied to the strand, and
- a mechanism to feed lubricant from the supply to the reservoir, in which the mechanism comprises an auger geared to the gear pump, and in which the anger is driven to oversupply the reservoir relative to the amount of lubricant being pumped by the gear pump.

* * * * *